(12) United States Patent
Shirakawa

(10) Patent No.: US 9,880,979 B2
(45) Date of Patent: Jan. 30, 2018

(54) INFORMATION PROCESSING TERMINAL, METHOD AND STORAGE MEDIUM FOR SWITCHING TO A PRIVACY MODE

(71) Applicant: CANON KABUSHIKI KAISHA, Tokyo (JP)

(72) Inventor: Yuki Shirakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 14/840,689

(22) Filed: Aug. 31, 2015

(65) Prior Publication Data

US 2016/0062958 A1    Mar. 3, 2016

(30) Foreign Application Priority Data

Sep. 2, 2014   (JP) ................................. 2014-178557

(51) Int. Cl.
   G06F 17/00     (2006.01)
   G06F 17/22     (2006.01)
   G06F 3/0483    (2013.01)

(52) U.S. Cl.
   CPC ........ *G06F 17/2205* (2013.01); *G06F 3/0483* (2013.01)

(58) Field of Classification Search
   CPC .......................... G06F 21/6263; G06F 17/2205
   See application file for complete search history.

(56) References Cited

U.S. PATENT DOCUMENTS

| 8,713,444 | B2* | 4/2014 | Sauve | G06F 17/30899 715/738 |
| 8,789,198 | B2* | 7/2014 | Phillips | G06F 21/6263 726/26 |
| 8,819,817 | B2* | 8/2014 | Croll | G06F 21/6263 713/189 |
| 9,213,775 | B2* | 12/2015 | Tseng | G06F 17/30884 |
| 9,418,243 | B2* | 8/2016 | Bauer | G06F 21/6263 |
| 9,519,395 | B1* | 12/2016 | Kuscher | G06F 3/0483 |
| 9,747,006 | B2* | 8/2017 | Fisher | G06F 17/30528 |
| 2002/0191020 | A1* | 12/2002 | Kaply | G06F 21/6209 715/764 |
| 2012/0240050 | A1* | 9/2012 | Goldfeder | G06F 21/6263 715/745 |
| 2015/0346929 | A1* | 12/2015 | Karunamuni | G06F 3/0483 715/777 |

FOREIGN PATENT DOCUMENTS

JP     2012-194970 A    10/2012

* cited by examiner

*Primary Examiner* — Amelia Tapp
(74) *Attorney, Agent, or Firm* — Canon U.S.A., Inc. IP Division

(57) ABSTRACT

Display of a screen for switching one tab or one window selected by a user to a privacy mode is controlled while the user browses a website in a tab or a window which is a target of a normal mode on a web browser.

11 Claims, 14 Drawing Sheets

FIG. 6

| WEBSTORAGE | CACHE | COOKIE | HISTORY | ... |
|---|---|---|---|---|
| xxx.co.jp.localstorage | aaa.html<br>bbb.js<br>ccc.jpg | xxx.co.jp.txt | xxx.co.jp/index.html<br>xxx.co.jp/sample.html | |
| yyy.co.jp.sessionstorage | hhh.html<br>iii.gif<br>jjj.swf<br>kkk.css | yyy.co.jp.cookie.txt | yyy.co.jp<br>yyy.co.jp/1<br>yyy.co.jp/2<br>yyy.co.jp/3 | |
| zzz.co.jp.localstorage | | zzz.co.jp.cookie.txt | zzz.co.jp<br>zzz.co.jp/project/test | | xxx.co.jp
yyy.co.jp
zzz.co.jp
...

601

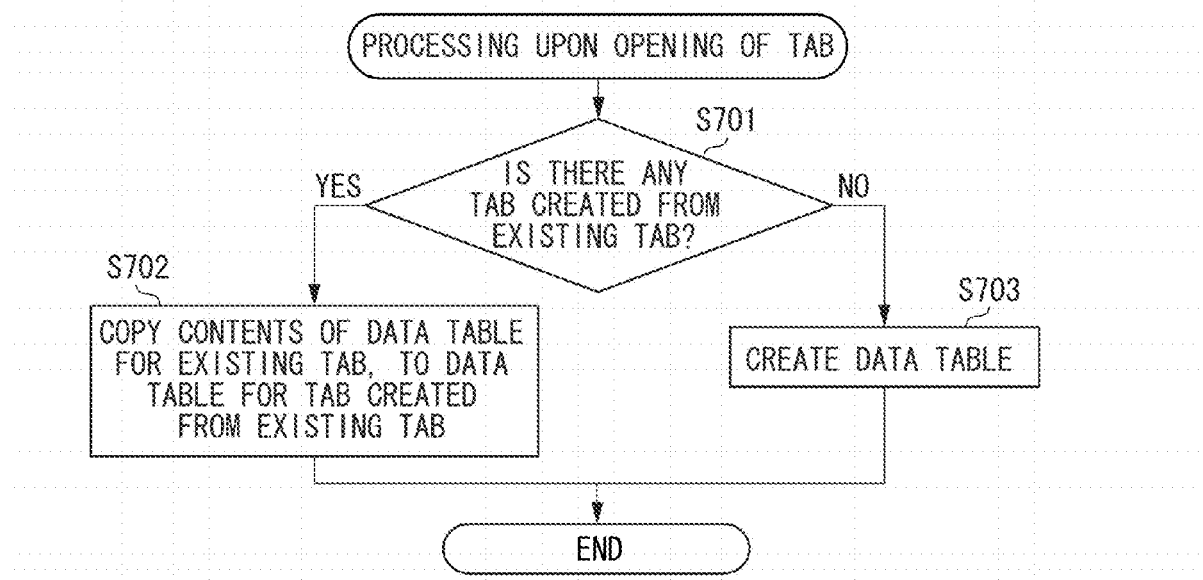
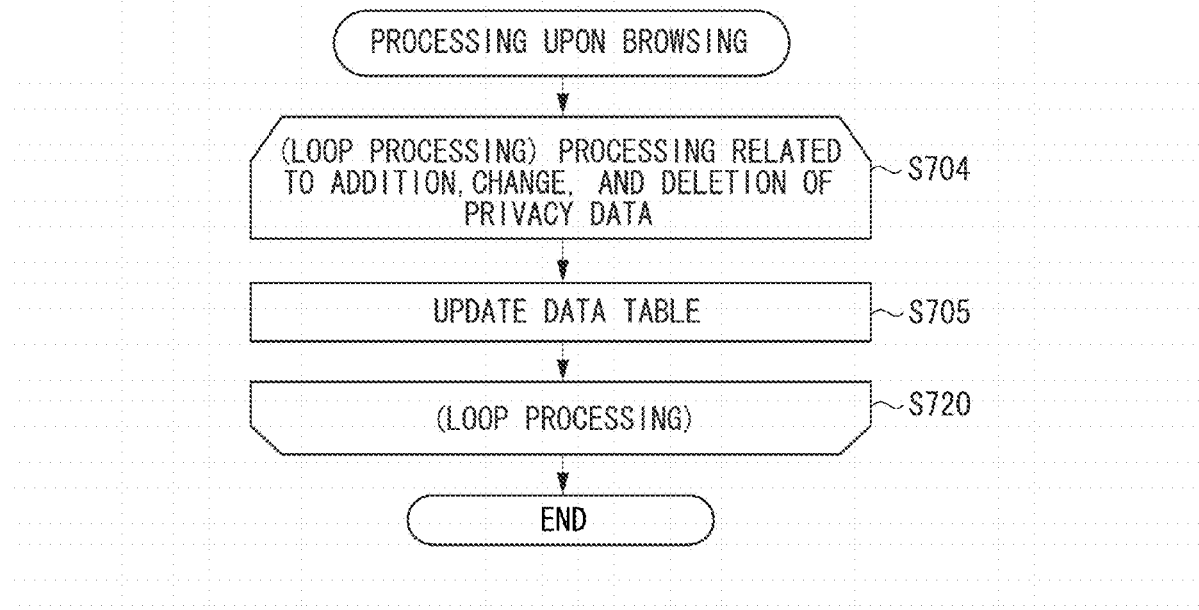

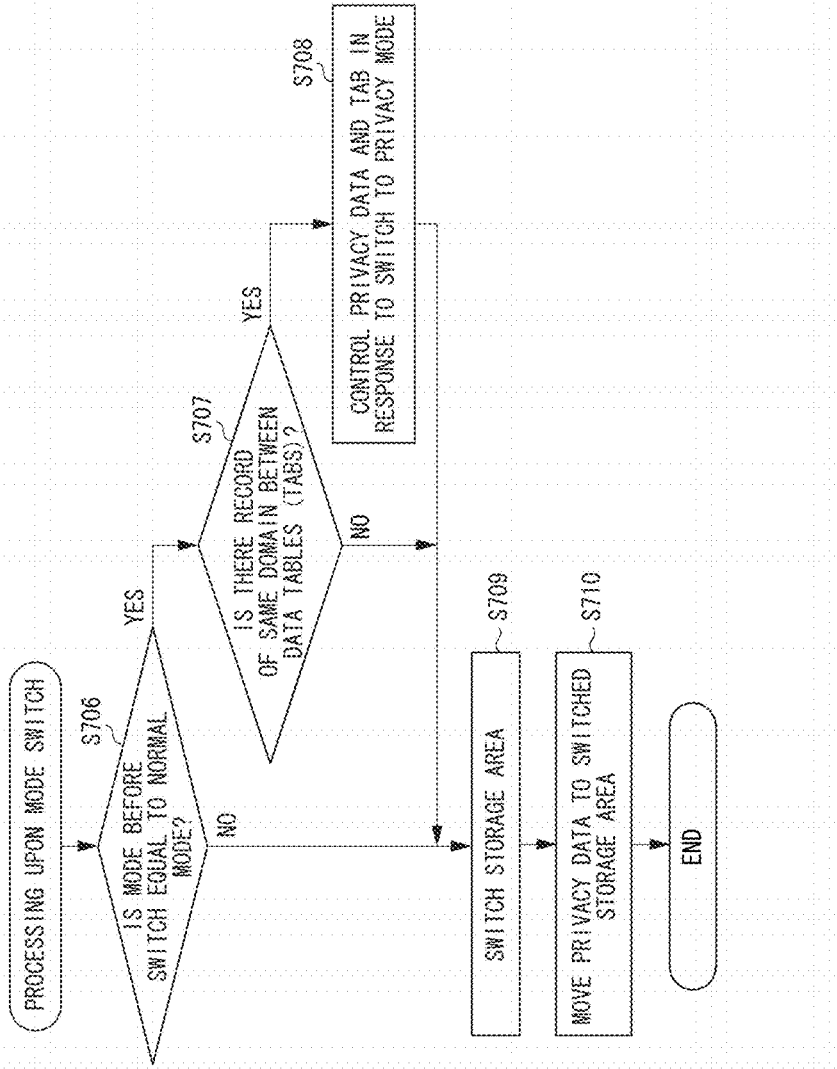

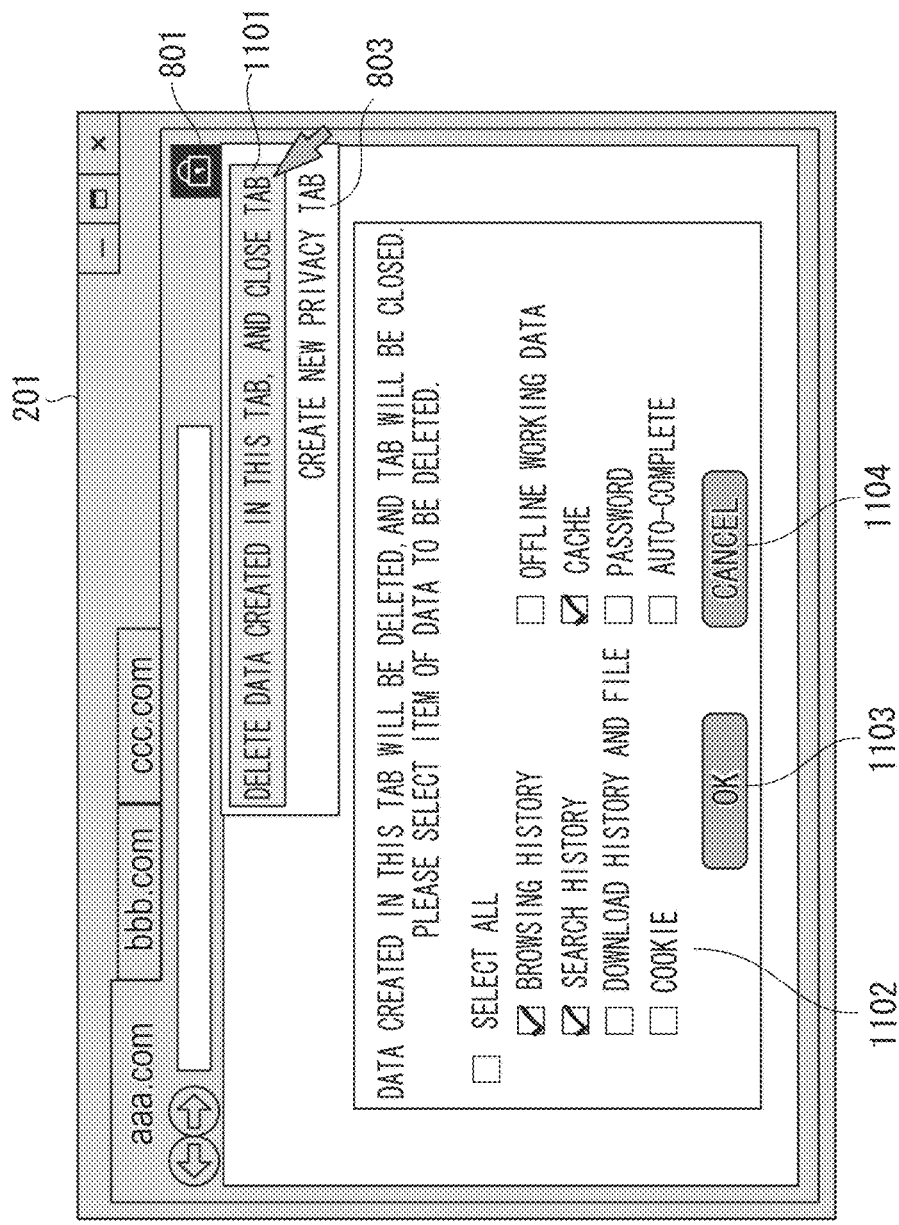

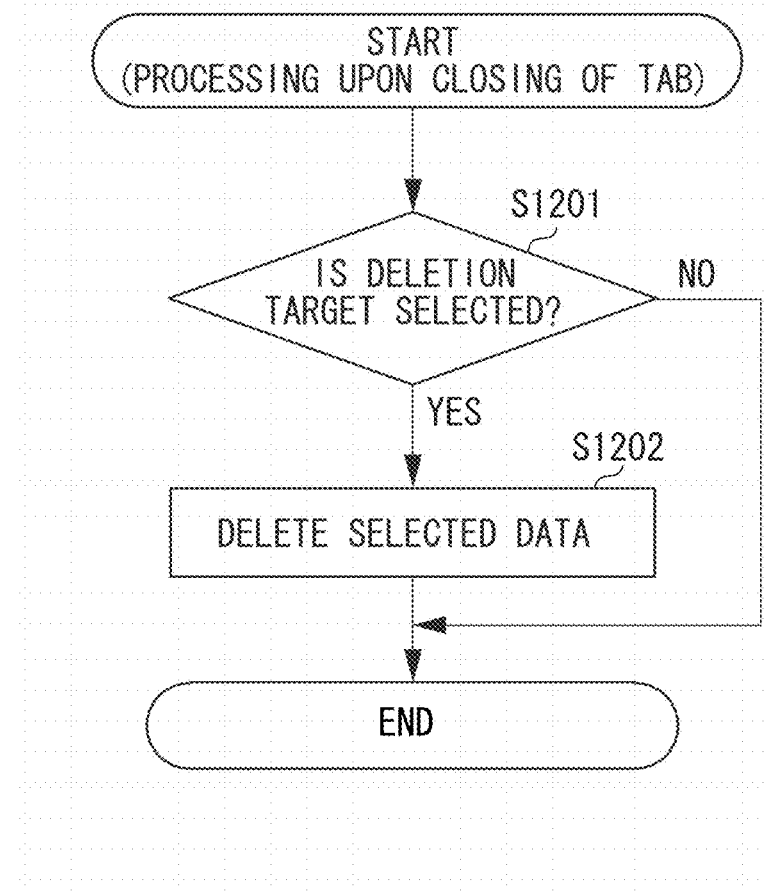

INFORMATION PROCESSING TERMINAL, METHOD AND STORAGE MEDIUM FOR SWITCHING TO A PRIVACY MODE

BACKGROUND OF THE INVENTION

Field of the Invention

The present generally relates to information processing and, more particularly, to an information processing terminal, an information processing method, a storage medium, and a technique for providing a mechanism of a data storage for a new web browser of HyperText Markup Language 5 (HTML5).

Description of the Related Art

As web applications have higher functionality, various functions of HTML5 are enhanced. Particularly, since mobile terminals such as smartphones, tablets, and the like widely spread, functions are enhanced to operate web applications offline. For example, there is an application cache function which caches in a web browser a file on a server, and a FileSystem application programming interface (API) which uses a FileSystem in a web browser. Further, there are functions such as a Web Storage and an IndexedDB which store data in a web browser.

Furthermore, a function which is referred to as a privacy mode is implemented in a web browser. This function is a function of, by manually switching a tab of a web browser to this mode before the tab is opened, preventing the web browser from storing, for reuse, data such as a history, a cache, or a Cookie created when a user browses a website in this tab (referred to as privacy data below). According to this function, privacy data is not stored in the web browser. Therefore, the user does not need to perform an operation of manually deleting privacy data after browsing a website. In this regard, privacy data which is not stored in the privacy mode includes data whose function is enhanced according to HTML5, such as data created by the Web Storage, the application cache, or the FileSystem API.

Japanese Patent Application Laid-Open No. 2012-194970 discusses a conventional technique related to switching of a privacy mode. According to Japanese Patent Application Laid-Open No. 2012-194970, a privacy probability is calculated under conditions as to whether information which a user wants to keep confidential is included in a given website and whether a user has previously used the privacy mode. Then, this technique automatically switches a mode to the privacy mode before a web browser accesses a website when the privacy probability is a given threshold or more.

As to the above function of switching a mode to the privacy mode of the web browser, when a user does not want to store privacy data, the user needs to switch the mode to the privacy mode in advance and then access a website. For example, the user needs to access a desired website after opening a new tab in the privacy mode. However, when the user forgets switching a mode to the privacy mode before access to a website is made or, while browsing a website, the user thinks that the user does not want to store privacy data, the user needs to manually delete privacy data.

Further, Japanese Patent Application Laid-Open No. 2012-194970 has a problem that, when a calculated privacy probability is not a given threshold or more, a mode is not switched to the privacy mode, and therefore a user cannot necessarily access a website in the privacy mode as the user intends. Furthermore, when, while browsing a website, the user thinks that the user does not want to store privacy data, the user still needs to manually delete privacy data.

SUMMARY OF THE INVENTION

The present disclosure provides a flexible method which allows a user to more appropriately switch to a mode (e.g., privacy mode) in which data created when browsing a website is automatically deleted.

According to an aspect of the present disclosure, an information processing terminal performs a web browser which stores data created when a website is browsed in a storage area of the information processing terminal. The information processing terminal includes a storage control unit configured to, when second data created when the website is browsed by using a tab of a second mode on the web browser or a window of the second mode has been stored in the storage area and the tab of the second mode or the window of the second mode is closed on the web browser, perform control to delete the stored second data in the storage area and a display control unit configured to, while a user browses the website by using a tab of a first mode on the web browser or a window of the first mode, display a screen for switching the tab or the window selected by the user from the first mode to the second mode, wherein, when the tab or the window switched to the second mode on the screen is closed, the storage control unit performs control to delete the stored second data for the tab or the window in the storage area, and wherein, when first data created when the website is browsed by using a tab of the first mode or a window of the first mode has been stored in the storage area and the tab the first mode or the window the first mode is closed on the web browser, the stored first data in the storage area is not deleted.

Further features of the present disclosure will become apparent from the following description of exemplary embodiments with reference to the attached drawings.

BRIEF DESCRIPTION OF THE DRAWINGS

FIG. 6 is a view illustrating a configuration example of a data table which stores privacy data.

FIGS. 7A, 7B, and 7C are flowcharts for explaining processing of the web browser according to a first exemplary embodiment.

FIG. 11 is a view illustrating an example of a dialogue provided by a web browser upon closing of a tab according to a second exemplary embodiment.

FIG. 12 is a flowchart for explaining processing of the web browser according to the second exemplary embodiment.

DESCRIPTION OF THE EMBODIMENTS

Exemplary embodiments for carrying out the present disclosure will be described below with reference to the drawings.

Figure 1:
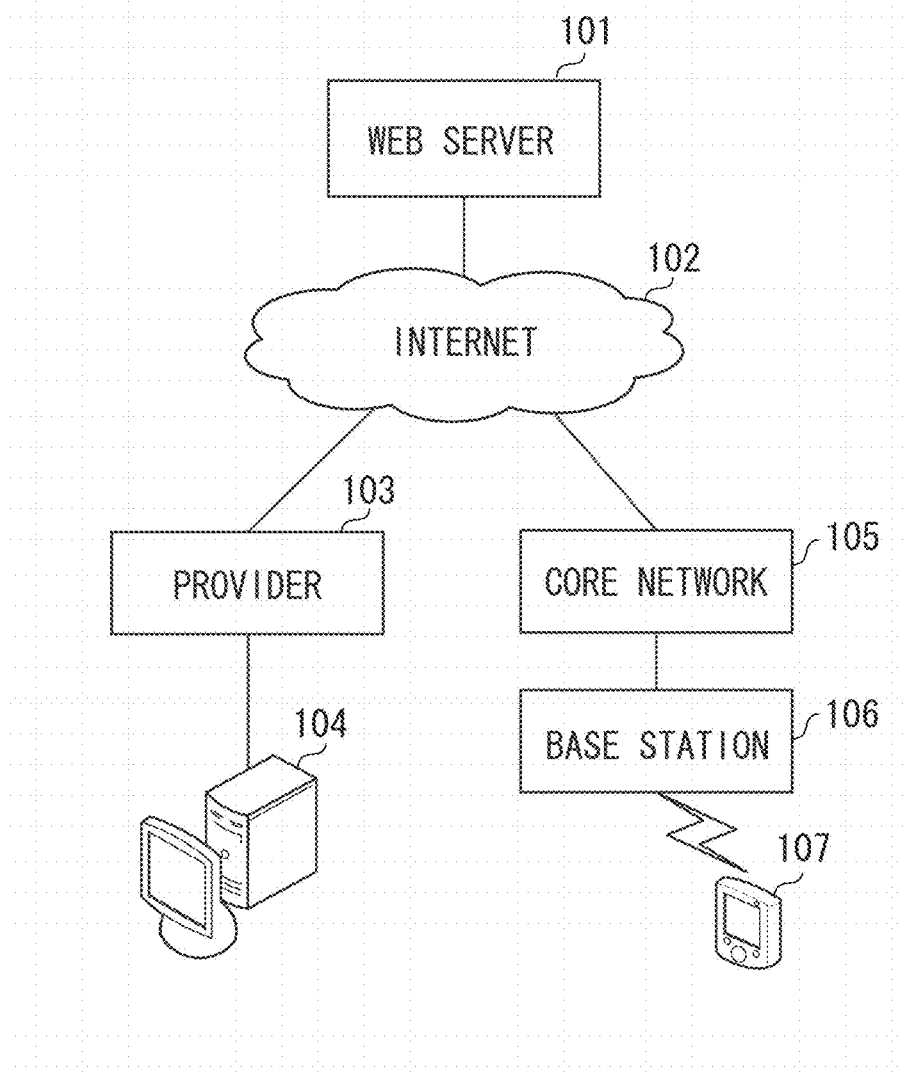
FIG. 1 is a view illustrating a network configuration example.

FIG. 1 is a view illustrating a network configuration example of a system according to an exemplary embodiment of the present disclosure.

An information processing apparatus 104 is a personal computer (PC) and the like which communicates with a provider 103 through an optical line, and is connected to an Internet 102 through the provider 103. An information processing terminal 107 is a terminal such as a tablet or a smartphone which communicates with a base station 106 by radio, and is connected to the Internet 102 through a core network 105. If the information processing terminal 107 has environment which enables execution of a web browser as described below, the information processing terminal 107 may be a wearable terminal such as a desk top PC, a car navigation system, a robot, an eyeglass, and a watch. A web server 101 is a system which provides websites to each information processing terminal through the Internet 102.

Figure 2:
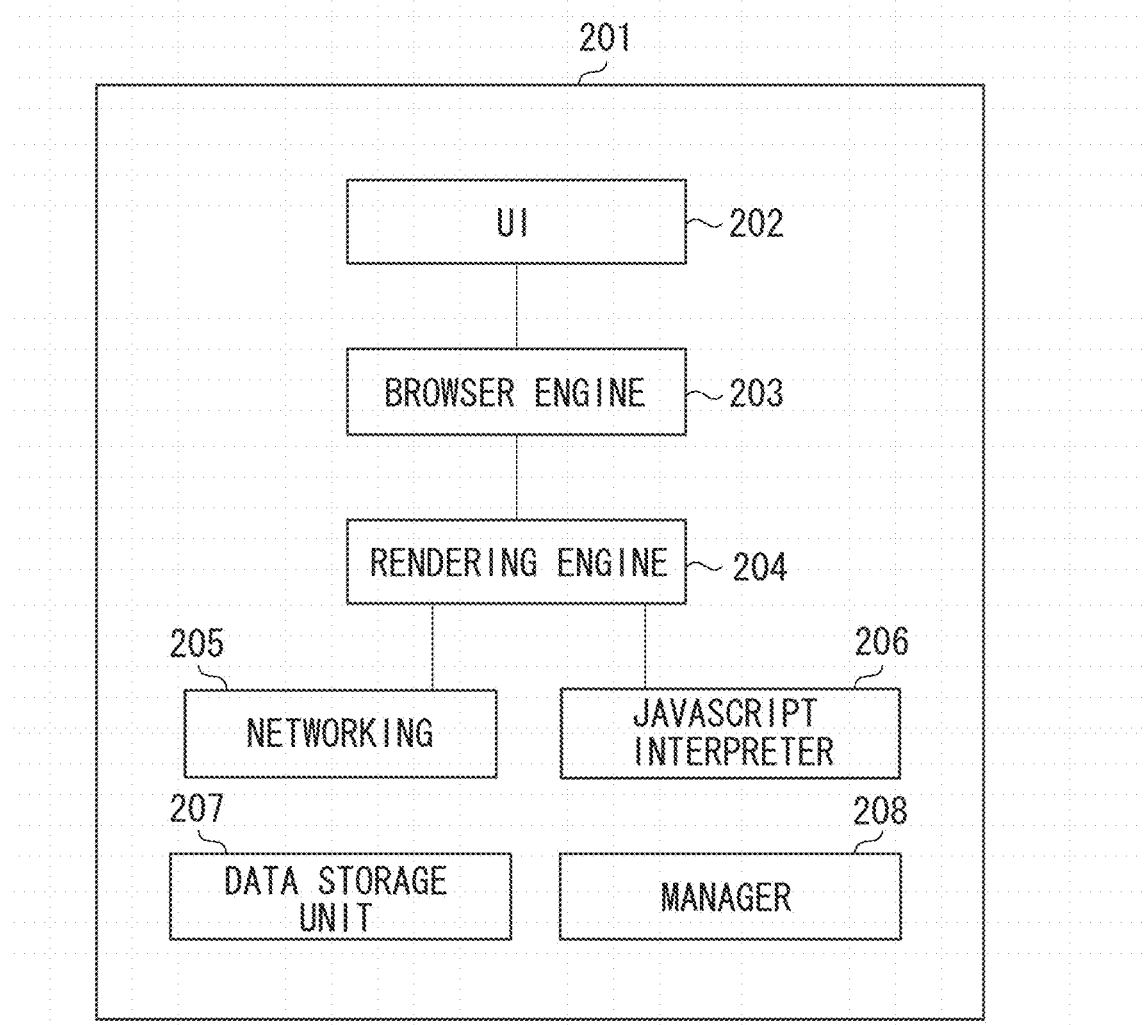
FIG. 2 is a block diagram illustrating a configuration example of a web browser.

FIG. 2 is a block diagram illustrating an entire configuration of a web browser 201 for which the present disclosure is carried out.

A user interface (UI) 202 is a module which performs display control of a web browser such as uniform resource locator (URL) display, bookmark display, and setting menu display of the web browser. A rendering engine 204 displays requested content such as HTML. A browser engine 203 performs processing between the UI 202 and the rendering engine 204. Networking 205 receives a network invocation such as a Hypertext Transfer Protocol (HTTP) request. A JavaScript® interpreter (referred to a JS printer) 206 analyzes and executes JavaScript® codes. A data storage unit 207 performs storage control to store, in a storage device, data such as a history, a cache, and a Cookie, and data of an application cache, a Web Storage, and an Indexed DB based on a storage specification related to HTML5. As used herein, the term "unit" generally refers to any combination of software, firmware, hardware, or other component, such as circuitry, that is used to effectuate a purpose.

The present disclosure further includes a manager 208 which controls mode switch and data storage in the web browser 201 unique to the present invention by using functions of the UI 202 to the data storage unit 207. The manager 208 may be mounted and implemented in the web browser 201, or may be added in a format of a plug-in program. In addition, storage control performed by the data storage unit 207 to store or delete data can be controlled by a web application according to JavaScript®.

The web browser according to an exemplary embodiment of the present invention has a function of switching a mode to a special mode to prevent the web browser from storing data (privacy data) such as a history, a cache, or a Cookie created when a user browses a website. This special mode will be referred to as a privacy mode below in an exemplary embodiment of the present disclosure. In this regard, in the privacy mode, the web browser performs control not to store data which is part of privacy data and is created by the Web Storage, the application cache, or the FileSystem API, either. Meanwhile, when the user browses a website in a normal mode, not in the privacy mode, the web browser performs control to optionally store privacy data such as a history or a cache in the storage device.

Figure 3:
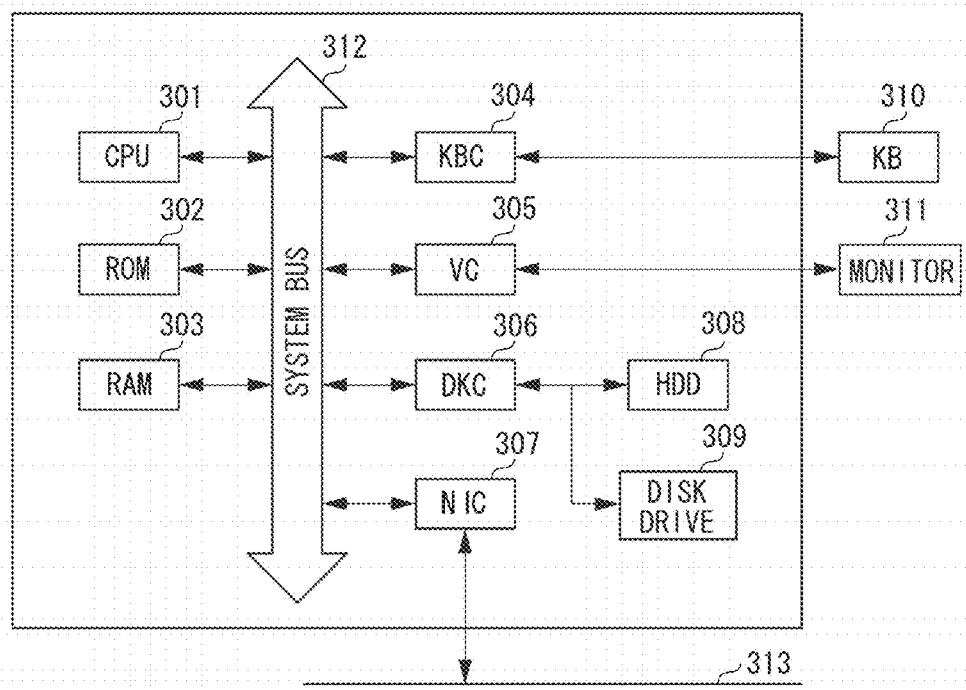
FIG. 3 is a block diagram illustrating a hardware configuration example of an information terminal.

FIG. 3 is a block diagram illustrating a hardware configuration of the information processing apparatus 104.

A central processing unit (CPU) 301 uses a random access memory (RAM) 303 as a working memory, executes a program stored in a read-only memory (ROM) 302 and a hard disk drive (HDD) 308 which is a storage device, and controls each component described below through a system bus 312. The HDD 308 stores an operating system (OS), various programs, and data. The CPU 301 accesses the HDD 308 and a disk drive 309 through a disk controller (DKC) 306, and installs the various programs in the HDD 308. The CPU 301 can also communicate with another computer or the like by means of a network interface card (NIC) 307 through a network 313.

The CPU 301 displays a UI on a monitor 311 by means of a video card (VC) 305 according to a program. A user operates a keyboard (KB) 310 or a pointing device such as a mouse to give an instruction and an input to the UI. The CPU 301 accepts a user's instruction and input through a keyboard controller (KBC) 304, and executes various types of processing according to the user's instruction and input.

Figure 4:
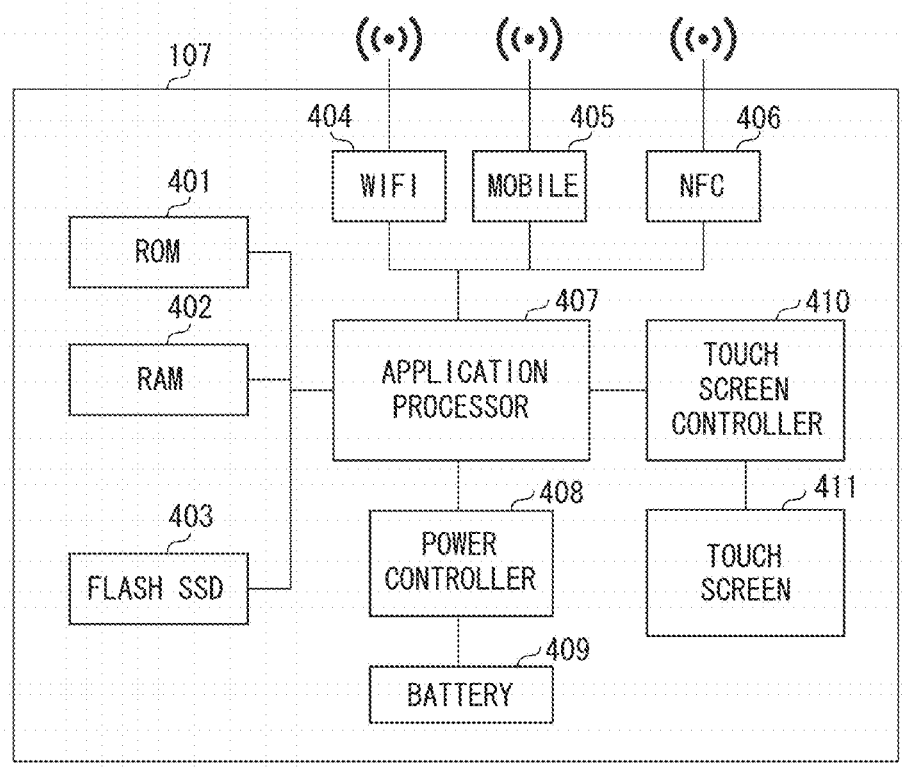
FIG. 4 is a block diagram illustrating a hardware configuration example of an information terminal.

FIG. 4 is a block diagram illustrating a hardware configuration of the information processing terminal 107 on which the web browser 201 can operate.

In FIG. 4, the information processing terminal 107 includes an application processor (referred to an AP below) 407, a ROM 401, a RAM 402, and a storage device 403 configured as a Flash solid state drive (SSD). The AP 407 executes software stored in the ROM 401 or the storage device 403, and integrally controls each device connected to the AP 407. The RAM 402 functions as a main memory or a working area of the AP 407. The storage device 403 stores the operating system, various applications such as a web browser, database data, user files, and the like. A touch screen controller 410 controls a touch screen 411 connected to the touch screen controller 410.

A wireless local area network (LAN) controller 404, a mobile communication controller 405, and a near-field wireless communication (NFC) controller 406 respectively control wireless LAN communication such as wireless fidelity (WiFi), cellular communication (such as mobile communication), and near-field wireless communication. Further, in the information processing terminal 107, a power controller 408 manages charge control and remaining power of a battery 409.

FIG. 4 illustrates a configuration example of the information processing terminal 107 to which the present disclosure is applicable. Hence, the information processing terminal 107 may further include hardware which provides network connection which is not illustrated, and hardware such as a camera. Further, a configuration without part of components such as the NFC controller 406 is applicable to the present disclosure. Furthermore, Bluetooth® is also applicable as a wireless communication scheme.

Figure 5A:
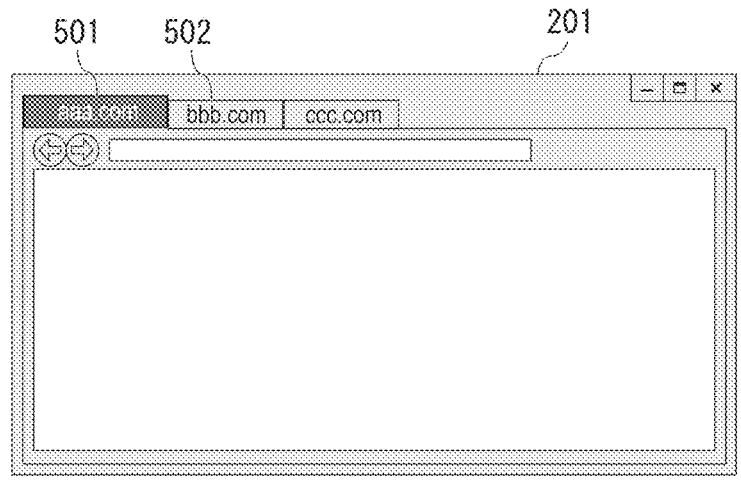
FIGS. 5A, 5B, and 5C are views illustrating display examples on a screen of a web browser in each mode.
Figure 5B:
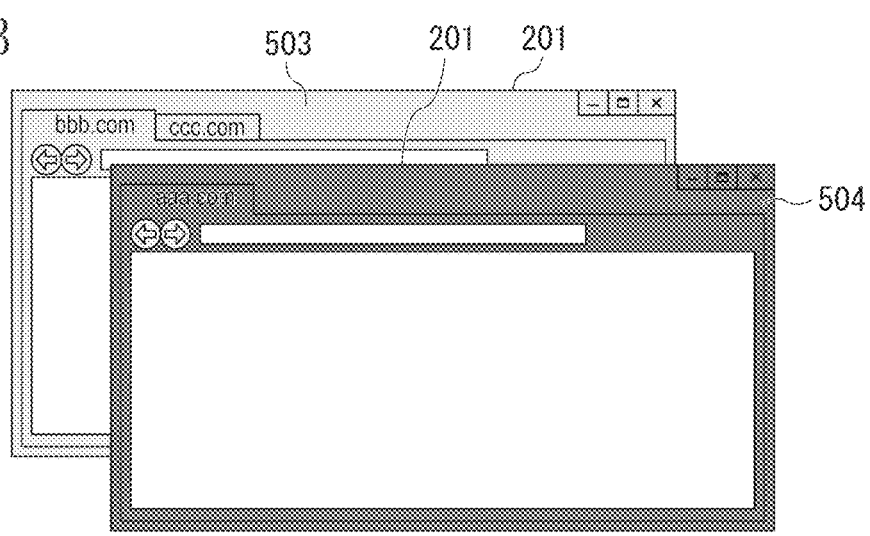
Figure 5C:
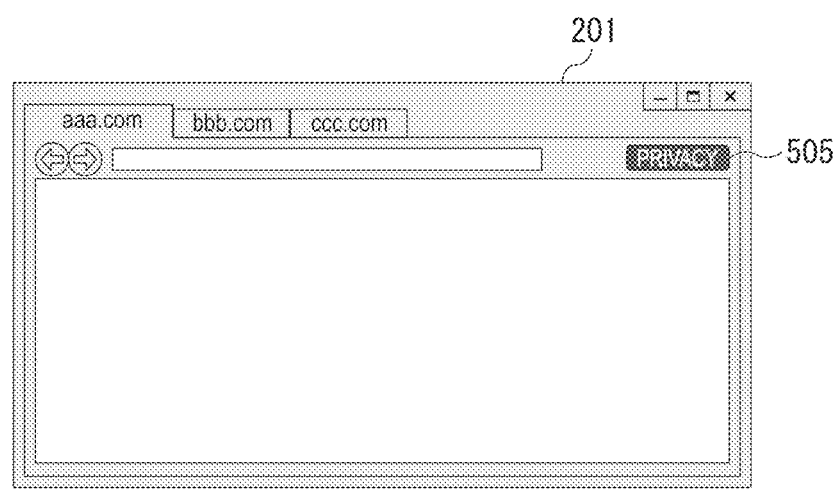

FIGS. 5A to 5C illustrate display examples of the web browser in the privacy mode. In case of a web browser in which a privacy mode function is implemented, when an access to a website is made in a tab or a window in the normal mode, privacy data is created in a permanent storage area of the storage area used by the web browser. Hence, even when a program of executing the web browser is finished, the privacy data is left stored in the permanent storage area and is reusable upon next activation, for example. By contrast with this, when an access to a website is made in a tab or a website in the privacy mode, privacy data is created in a temporary storage area. Therefore, when this tab or window is closed, the privacy data is deleted. As a result, when the access to the website is made in the tab in the privacy mode, the privacy data is stored only while this tab is used in this mechanism.

FIG. 5A illustrates the display example of the web browser 201 in the privacy mode in a case where the normal mode and the privacy mode are separately used per tab. On the web browser 201 in FIG. 5A, a tab 501 is a tab in the privacy mode, and a tab 502 is a tab in the normal mode.

FIG. 5B illustrates the display example of the web browser 201 in the privacy mode in a case where the normal mode and the privacy mode are separately used per window. On the web browser 201 in FIG. 5B, a window 503 is a window in the normal mode, and a window 504 is a window in the privacy mode.

FIG. 5C illustrates the display example of the web browser 201 in the privacy mode in a case where the normal mode and the privacy mode are switched in a single window. The web browser 201 in FIG. 5C is a web browser which switches a mode of the entire window and in which a current mode 505 of the web browser 201 is indicated. When the privacy mode is set on this web browser 201, and when the web browser 201 is activated, privacy data is constantly not created in the permanent storage area in any tab or window.

The present disclosure is applicable to a web browser which has various types of privacy mode functions as illustrated in FIGS. 5A, 5B, and 5C. Further, features of the present disclosure include that the web browser 201 can switch a tab to the privacy mode while a website is viewed even when the tab is not opened in the privacy mode in advance. Furthermore, the features further include that it is also possible to switch the privacy mode to the normal mode.

The web browser 201 illustrated in FIGS. 5A to 5C is not limited to a PC web browser, and is also applicable to various information processing terminals such as tablets or smartphones. Particularly, an example of a UI when the web browser 201 is applied to a tablet or a smartphone will be described below.

FIG. 6 illustrates an example of a data table which temporarily stores privacy data created by the web browser 201 or a reference destination of the privacy data, and includes 0 or more record per domain of a website.

A data table 601 is created per tab or window when the tab or the window is opened, and is updated every time privacy data is created or changed. More specifically, an access to a plurality of websites is sequentially made by using one tab according to a user's operation, and a record is generated per accessed website in the data table 601. In addition, the data table 601 may be generated by a method for creating a common table for all tabs and distinguishing data of each tab based on an identifier without creating the data table 601 per tab. In the present exemplary embodiment, a case where the data table 601 is created per tab will be described below.

According to an exemplary embodiment of the present disclosure, upon mode switch of the web browser 201, the data storage unit 207 of the web browser 201 moves privacy data between the permanent storage area and the temporary storage area based on a description of the data table 601. Thus, whether privacy data is permanently stored for reuse is controlled. According to this method, even after an access to a website is made in the normal mode, i.e., even after privacy data is created in the permanent storage area, it is possible to prevent the web browser 201 from storing the privacy data by moving the privacy data to the temporary storage area.

Further, FIG. 6 illustrates that one record is stored per domain. However, the present disclosure is not limited to this method, and may adopt a method for describing a domain together with a subdomain or a method for describing a domain in origin (protocol+domain+port number) units. As to contents to be stored in the data table 601, there are a method for directly describing data contents and a method for describing data storage destinations. However, a description method is not limited in particular.

FIGS. 7A to 7C are flowcharts for explaining processing related to data control upon mode switch of the web browser 201. FIGS. 7A to 7C illustrate processing examples when the CPU 301 executes a program for realizing the web browser 201 having the features of the present disclosure. Each processing will be described in detail below.

First, FIG. 7A illustrates processing upon opening of a tab in the web browser 201.

In step S701, the manager 208 determines whether a tab is created as a new tab or from an existing tab when the tab is created in the web browser 201. The manager 208 determines that the tab is the new tab in a case where the user explicitly created the tab as a new tab. When, for example, a tab is opened from a link of a website by using target="_blank" in <a>tag (anchor tag) of HTML, the manager 208 determines that the tab has been created from the existing tab. If the manager 208 determines that the tab has been created from the existing tab (Yes in step S701), the processing proceeds to step S702, and, if the manager 208 determines that the tab has been created as a new tab (No in step S701), the processing proceeds to step S703.

In step S702, the manager 208 copies contents of the data table 601 managed for the existing tab to a data table newly created for the tab created from the existing tab.

A copying method may be a method for copying the data table 601 of the existing tab to a table area of the newly created tab or a method for inserting a record of the data table 601 of the existing tab after a data table is created for the newly created tab.

In step S703, the manager 208 creates and manages a data table for the new tab.

FIG. 7B illustrates processing upon browsing when an access to a website is made in the web browser 201 to browse or operate.

Loop processing indicated by step S704 is processing which is repeated every time an access to a website is made according to a user's input operation through the UI 202, and privacy data is added, changed, or deleted when the user works on the website. More specifically, the processing is repeated every time a history or a cache created upon an access to a website, a Cookie created by a user's operation, or data in the Web Storage is added, changed, or deleted. In step S720, when, for example, a tab or the web browser 201 is closed (finished), the processing gets out of the loop processing.

In step S705, the manager 208 updates the data table for the tab when the data storage unit 207 performs control to add, change, or delete privacy data. When an operation of moving to another website is performed in the same tab, a new record corresponding to this website is added to the data table.

FIG. 7C explains processing upon switching between the normal mode and the privacy mode.

In step S706, the manager 208 determines, upon mode switch, whether a current mode before the mode switch is the normal mode. The web browser 201 according to an exemplary embodiment of the present disclosure can switch a mode while the user browses a website in the existing tab.

Hence, the mode before the mode switch is to be checked in step S706. If the mode before the mode switch is the normal mode (Yes in step S706), the processing proceeds to step S707, and, if the mode is the privacy mode (No in step S706), the processing proceeds to step S709.

In step S707, whether there are overlapping domains between a record included in the data table 601 for a switching target tab and a record included in the data table 601 for another tab in the web browser 201 is checked as processing before the mode switch. In step S707, if the record of the same domain is detected for another tab (Yes in step S707), the processing proceeds to step S708 and, if the record is not detected (No in step S707), the processing proceeds to step S709.

In this regard, in the present exemplary embodiment, a storage area in which privacy data used for a tab is stored is switched to one of the permanent storage area and of the temporary storage area in response to the mode switch. Further, the privacy data used in the tab until the mode switch is also moved to the switch destination storage area. In this case, when the privacy data is moved, other tabs which refer to common data in the same storage area are likely to lose a reference destination. Hence, when there is data of overlapping domains in privacy data used in each of a plurality of tabs before the mode switch, the web browser 201 needs to perform appropriate processing to prevent the reference destination from being lost.

In step S707, domains which are targets to be checked as to whether the domains overlap may be checked together with a subdomain or in origin units. Further, domains which are targets to be checked as to whether the domains overlap may target at all records of the data table 601 to be checked, or target only a domain of a website which is being browsed.

In step S708, the manager 208 controls privacy data and tabs related to the same domain detected in step S707. For example, assume that the data table 601 for a privacy mode switching target tab includes a record of an "xxx.co.jp" domain, and the data table 601 for another tab in the normal mode also includes a record of the same domain. In this case, in step S707, common privacy data between another tab and the privacy mode switching target tab is deleted for the record of the "xxx.co.jp" domain described in the data table 601 for another tab in the normal mode. Further, control may be performed to display a warning screen (FIG. 9), which is described below, through the UI 202 although such control can be skipped.

In addition, when the control in step S707 is performed, the user may be allowed to select, as deletion data, data of a record of the same domain which will not be used in another tab in the normal mode in the future. Further, another tab in the normal mode having a record of the same domain may be switched to the privacy mode together.

In step S709, the data storage unit 207 switches a storage area in which privacy data is stored according to the switched mode of the web browser 201. As described above, privacy data is stored in the permanent storage area in the normal mode, and privacy data is stored in the temporary storage area in the privacy mode.

In this regard, a method for specifying a storage area as the permanent storage area or the temporary storage area in response to mode switch performed while the user browses a website includes a method for a static specifying method and a dynamic specifying method. According to an exemplary embodiment of the present disclosure, both of these methods can be adopted.

In case of the static specifying method, upon mode switch of a tab, it is necessary to close the tab once, specify a storage area used upon execution of the application program of the web browser 201, and open the tab again. In this case, it is necessary to store a URL of a website which the user browses before the mode switch, specify this URL, and open the tab again. In case of the dynamic specifying method, upon mode switch of a tab, a storage area to be used is switched while an application program of the web browser 201 is executed. It is then necessary to perform reloading to update display of the website to the latest display after switching the storage area to be used.

In step S710, the manager 208 moves privacy data to the storage area switched and specified in step S709 based on contents of the data table 601 for the tab whose mode has been switched. When a mode is switched to the privacy mode, privacy data moves to the temporary storage area. In this case, when the tab whose mode has been switched is closed (finished), the privacy data moved to the temporary storage area is deleted.

In addition, when each mode differs between windows as in FIG. 5B or when a mode is switched in a web browser unit as in FIG. 5C, mode switch performed while the user browses a website and processing of moving privacy data in response to the mode switch described according to FIGS. 7A to 7C are applicable likewise. In this case, the manager 208 needs to manage the data table 601 per window.

According to the above process, even while the user browses a website and even when the user forgets opening a tab in the privacy mode, by switching a mode to the privacy mode, it is possible to prevent privacy data created after this tab is opened from being stored. Further, by moving data, data can be taken over between the modes. Consequently, even when the mode is switched, the user can browse and operate a website without caring about contents of privacy data.

Figure 8A:
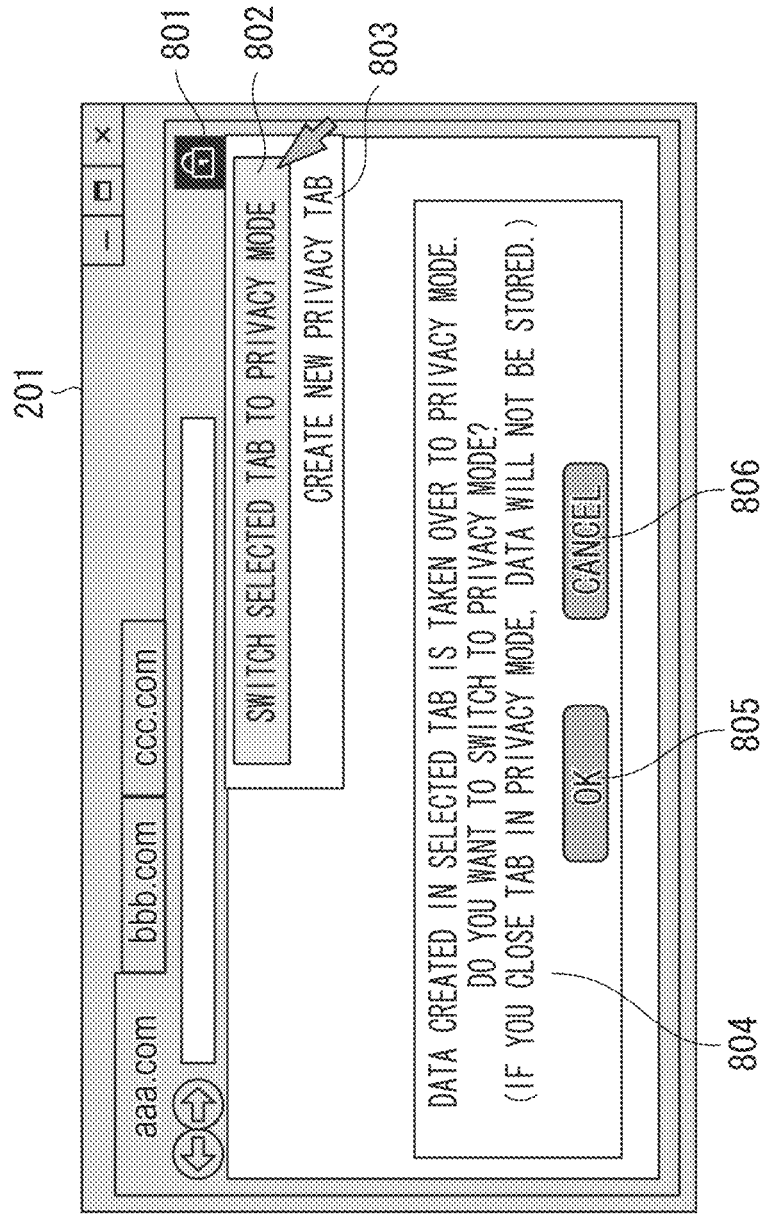
FIGS. 8A and 8B are views illustrating examples of display contents of the screen upon mode switch of the web browser.
Figure 8B:
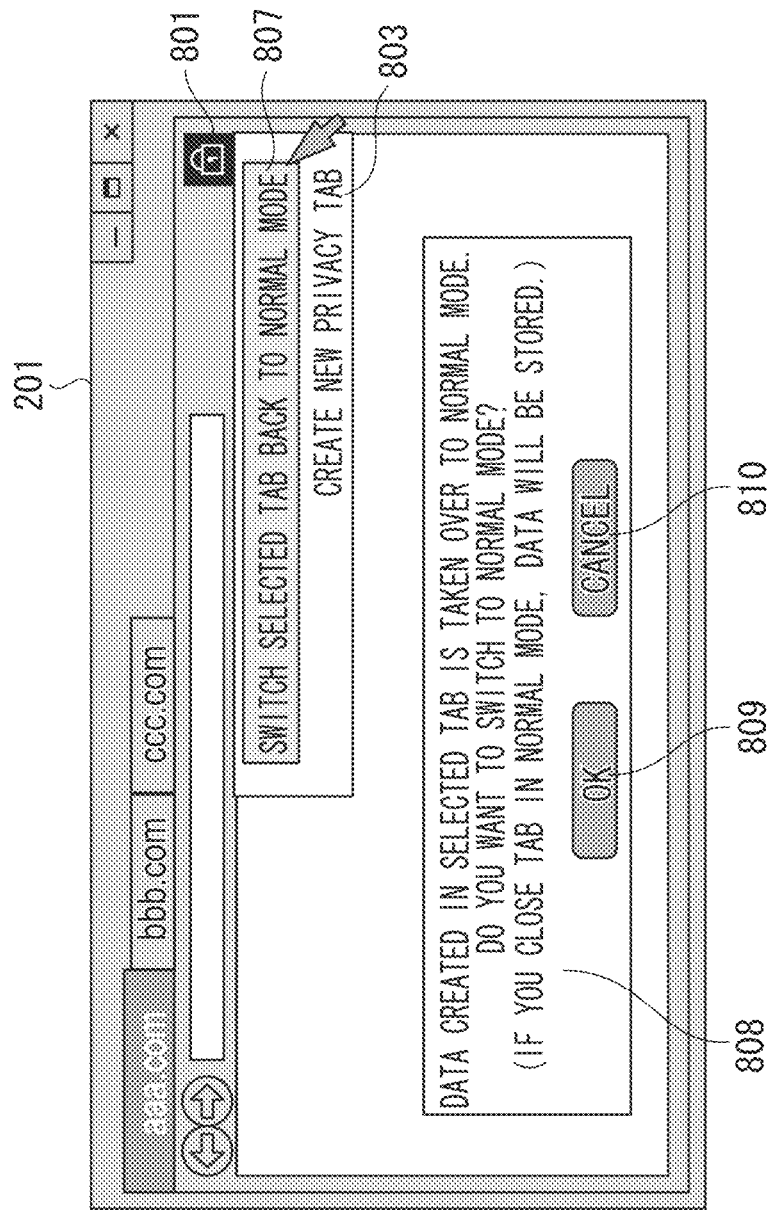

FIGS. 8A and 8B are views illustrating examples of display contents of a screen provided through the UI 202 upon mode switch of the web browser 201.

A button 801 is a button which can give an instruction to start switching a mode and allows the user to check a state of the privacy mode. When the button 801 is pushed, a menu 802 and a menu 803 are displayed in the normal mode. In addition, when a current mode is the privacy mode, the button 801 may be displayed with a special icon or a special color to allow the user to intuitively grasp the privacy mode. The menu 802 is displayed to allow the user to select only when a target tab is in the normal mode.

In the present exemplary embodiment, an example where a dialogue 804 including a confirmation message is displayed when the user pushes the menu 802 will be described. This confirmation message indicates that privacy data of a target tab is managed in the privacy mode and that privacy data is not stored (the privacy data cannot be reused) in the privacy mode. When the user pushes a button 805, the target tab is switched to the privacy mode. More specifically, in the example in FIG. 8A, a tab indicating "aaa.com" indicating a website to which an access is currently made is switched to the privacy mode. When the user pushes a button 806, the mode switch is interrupted and the dialogue 804 is closed.

When the user pushes the menu 803, the web browser 201 creates a new tab in the privacy mode instead of switching a mode of an existing tab. In this case, a new tab may be created or a new window may be created.

In FIG. 8B, a menu 807 is displayed to allow the user to select only when a target tab is in the privacy mode. When the user pushes the menu 807, a dialogue 808 including a confirmation message is displayed. When a button 809 is pushed on this dialogue 808, the target tab is switched to the normal mode. Meanwhile, when a button 810 is pushed, the web browser 201 interrupts mode switch and closes the dialogue 808.

For example, in FIG. 8B, in the tab which is currently in the privacy mode and indicates "aaa.com", the user pushes the menu 807 and the dialogue 808 is displayed. The confirmation message of the dialogue 808 indicates that privacy data of the target tab is managed in the normal mode, and privacy data is stored for reuse in the normal mode.

Figure 9:
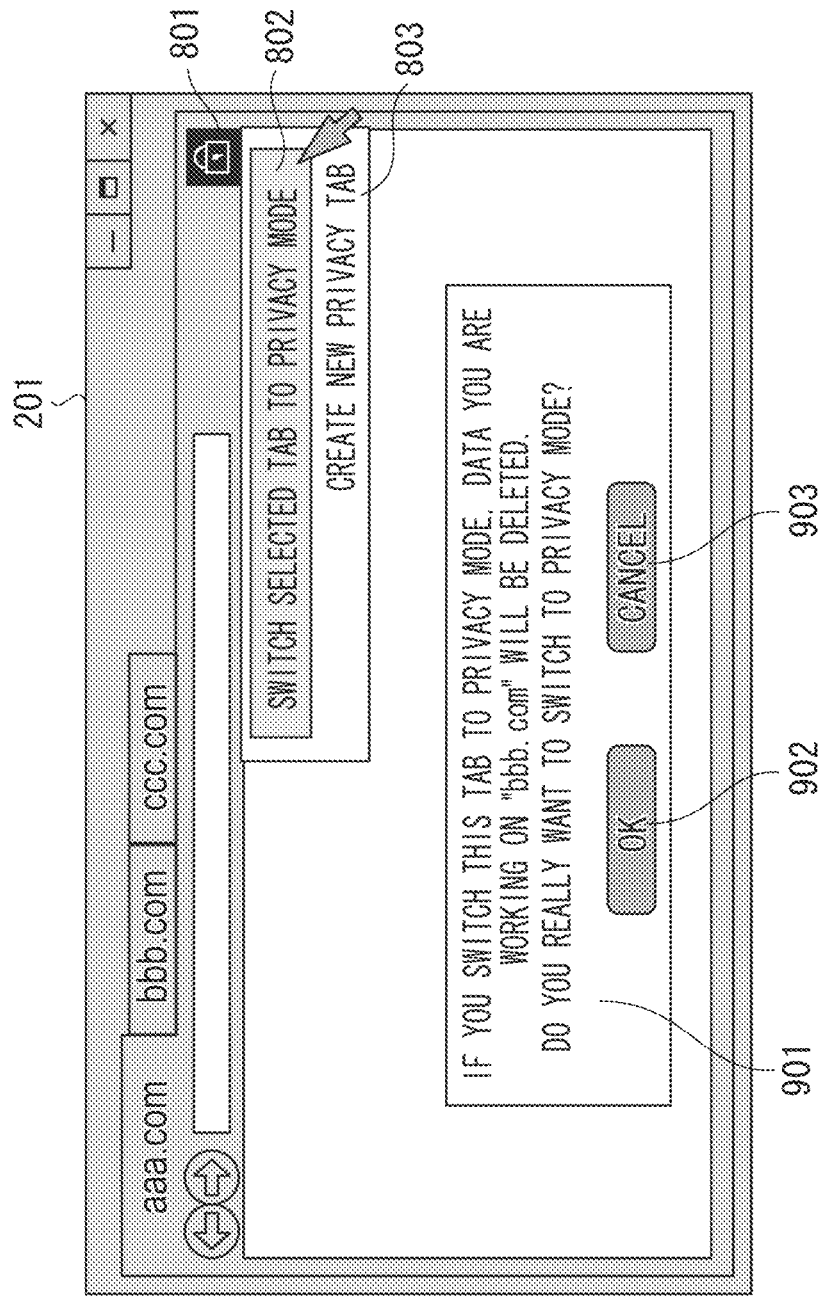
FIG. 9 is a view illustrating an example of a warning screen of the web browser.

FIG. 9 is a view illustrating an example of display contents of a screen provided through the UI 202 of the web browser 201 according to predetermined conditions when, for example, the user pushes the button 805 in FIG. 8A to switch a mode to the privacy mode. In this regard, the predetermined conditions are that there are the same domain between a record included in the data table 601 for a target tab to be switched to the privacy mode, and a record included in a data table for another tab. This is a case where Yes is determined in the above processing in step S707.

When the user pushes a button 902, on the warning screen illustrated in FIG. 9, the processing in step S708 is executed. On the other hand, when the user pushes a button 903 while the warning 901 is displayed thereon, the mode switch to the privacy mode is interrupted, and this screen is closed. The warning 901 indicates that privacy data of a website to which an access has been made in another tab is also simultaneously deleted.

Figure 10:
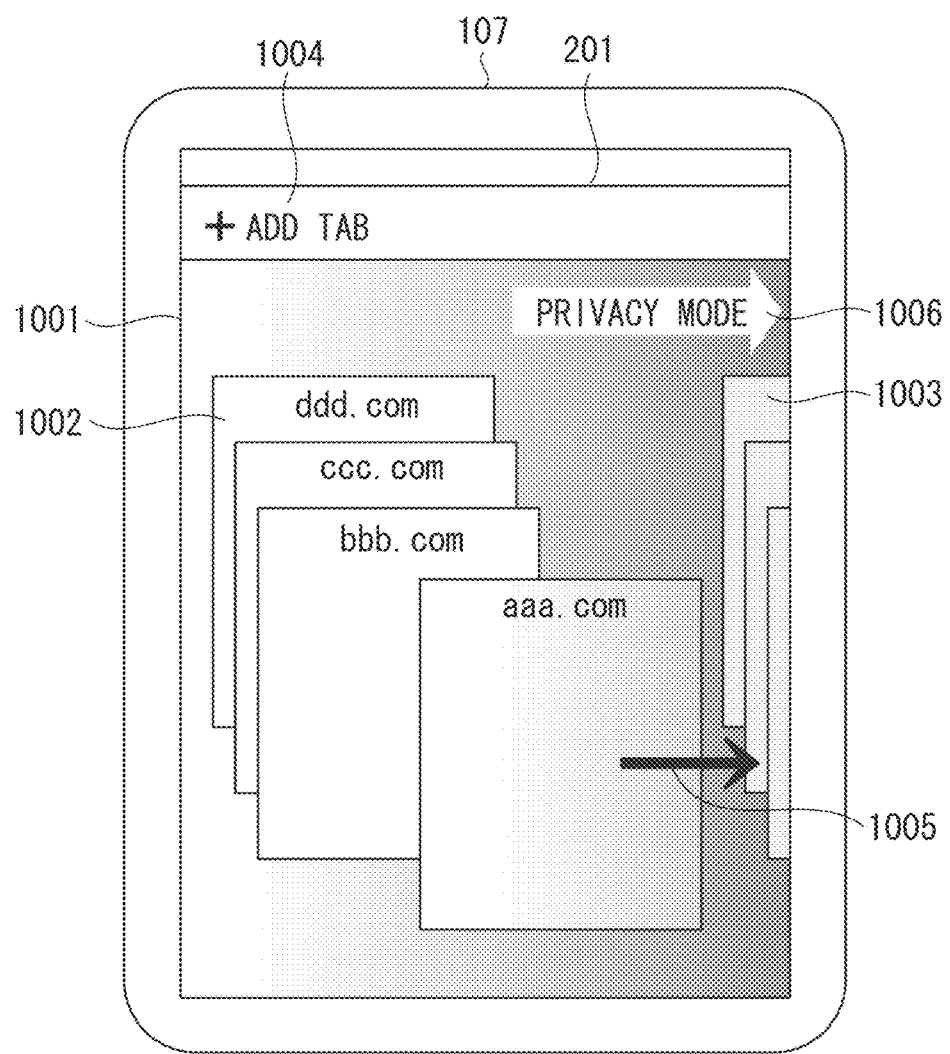
FIG. 10 is a view illustrating an operation example upon the mode switch.

FIG. 10 is a view illustrating an operation example of mode switch of the web browser 201 which operates on the information processing terminal 107. Hereinafter, the web browser 201 which can perform a mode switching operation other than the operations described in the first exemplary embodiment will be described.

The web browser 201 which provides a screen illustrated in FIG. 10 can switch a mode per tab even while the user browses a website. A privacy data management method is the same as that of the above-described first exemplary embodiment.

A list of a plurality of tabs managed by the web browser 201 is displayed on a screen 1001. Tabs 1002 indicate a list of one or more tabs in the normal mode. By tapping one of the tabs in the list, this tab is displayed in a full screen, and the user can start browsing the screen.

Tabs 1003 indicate a list of one or more tabs in the privacy mode. In an example in FIG. 10, the screen 1001 currently displays a selection screen of the tabs in the normal mode. Therefore, the tabs 1003 are arranged outside the screen.

A button 1004 is arranged to add a new tab. In the example in FIG. 10, the screen 1001 displays a selection screen of the tabs in the normal mode. Therefore, when this button 1004 is pushed, the tab 1002 in the normal mode can be added.

An operation 1005 indicates a flick operation. In the example in FIG. 10, according to the operation 1005, by flicking the tab in the normal mode to the right, it is possible to switch this tab to the privacy mode. Although not illustrated, when the screen 1001 displays the selection screen in the privacy mode, it is possible to switch a target tab to the normal mode by flicking the tab 1003 to the left.

When a button 1006 is pushed, a mode of the selection screen of the tabs of the screen 1001 is switched to a selection screen in the privacy mode. In addition, on the screen 1001 switched by the button 1006, a button with a name of "normal mode" and the like is arranged to switch the privacy mode to the normal mode. Further, by pushing the button 1006, the screen 1001 can be switched to a selection screen of tabs per mode. However, a mode may be switched by swiping the screen 1001.

In addition, in the first exemplary embodiment and an application example, the flick operation for mode switch has been described. However, the present disclosure is not limited to this operation. A mode can also be switched by using, for example, voice recognition or gesture recognition such as user's hand, arm, and head.

In a second exemplary embodiment, a method, which is different from that of the first exemplary embodiment, for preventing a web browser from storing at least part of privacy data even when an access to a website is made in the normal mode will be described. The second exemplary embodiment assumes that the same system and components as those in the first exemplary embodiment such as an information processing terminal 107 and a web browser 201 are provided unless described in particular.

FIG. 11 is a view illustrating a display example of a dialogue for making settings to delete privacy data when a tab provided by the web browser 201 is closed. Similar to the first exemplary embodiment, by using the data table 601, it is possible to delete privacy data and then close a target tab according to the settings.

When a user selects a menu 1101, a dialogue 1102 is displayed, and the user can select a type of privacy data which is a deletion target on this dialogue 1102. Selection candidates correspond to fields of each record of the data table 601. More specifically, the selection candidates include information such as browse/search history data, a Cookie, cache data, a password, and auto-complete. In addition, data which can be used for an offline operation such as data created by a Web Storage, an application cache, and a FileSystem API is displayed as a candidate.

When the user pushes a button 1103, the web browser 201 refers to a field of each record of the data table 601 for deletion target data selected on the dialogue 1102. When the tab is finished, target privacy data is deleted. In addition, it is also possible to disable selection of a type of privacy data to be deleted. In this case, the dialogue 1102 is to be omitted. When the user pushes a button 1104, processing is interrupted, and the dialogue 1102 is closed.

FIG. 12 is a flowchart for explaining processing when the web browser 201 accepts a user's instruction to close a tab and the menu 1101 is selected.

In step S1201, the manager 208 determines whether a deletion target has been selected on the dialogue 1102. When it is determined that the deletion target has been selected (Yes in step S1201), the processing proceeds to step S1202, and when it is determined that the deletion target has not been selected (No in step S1201), the processing ends.

In step S1202, the manager 208 refers to the data table 601 for a target tab, and the data storage unit 207 performs control to delete privacy data selected on the dialogue 1102 according to this reference. Further, the data table 601 of the target tab itself is deleted.

A timing at which the dialogue 1102 is displayed comes when an instruction to close a tab is accepted from the user or when the user manually gives a display instruction for advance settings for closing a tab later.

An example where the user selects arbitrary deletion target privacy data without using the privacy mode has been described in the second exemplary embodiment. However, a combination of the second exemplary embodiment and the first exemplary embodiment is also applicable to the web browser 201. In this case, it is also possible to select on the dialogue 1102 a type of privacy data which is to be deleted in the first exemplary embodiment.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-178557, filed Sep. 2, 2014, which is hereby incorporated by reference herein in its entirety.

What is claimed is:

1. An information processing terminal in which a web browser which stores data created when a website is browsed in a storage area of the information processing terminal operates, the information processing terminal comprising:
   a memory storing instructions; and
   a processor which is capable of executing the instructions causing the information processing terminal to:
   store first data created when the website is browsed by using a tab of a first mode or a window of the first mode, in a first area secured in the storage area to be reused in another tab or window;
   when second data created when the website is browsed by using a tab of a second mode on the web browser or a window of the second mode has been stored in the storage area and the tab of the second mode or the window of the second mode is closed on the web browser, perform control to delete the stored second data in the storage area;
   while a user browses the website by using a tab of the first mode on the web browser or a window of the first mode, display a screen for switching the tab or the window selected by the user from the first mode to the second mode;
   in response to switching to the second mode on the screen, store data created when the website is browsed by using a tab or a window which has been switched to the second mode, in a second area different from the first area, as the second data; and
   when the tab or the window which has been switched to the second mode on the screen is closed, perform control to delete the stored second data for the tab or the window in the second area,
   wherein, when the first data has been stored in the first area and the tab of the first mode or the window of the first mode is closed on the web browser, the stored first data in the first area is not deleted, and
   wherein, in response to the switching to the second mode on the screen, the web browser is reactivated so that the data is stored in not the first area but the second area.

2. The information processing terminal according to claim 1, wherein the instructions further cause the information processing terminal to, when the tab or the window which has been switched to the second mode on the screen, perform control to delete also the first data related to the website browsed when the tab or the window was in the first mode.

3. The information processing terminal according to claim 1, wherein the instructions further cause the information processing terminal to, while the user browses the website in the tab of the second mode or the window of the second mode on the web browser, display a switching screen for switching the tab or the window to the first mode.

4. The information processing terminal according to claim 1, wherein the instructions further cause the information processing terminal to, when accepting an instruction to switch to the second mode on the screen, display a warning screen for notifying that overlapping data in data created by using a tab or a window different from the tab or the window which is a switching target is also a deletion target.

5. The information processing terminal according to claim 1, wherein the instructions further cause the information processing terminal to display a selecting screen for selecting a type of data which is a deletion target.

6. The information processing terminal according to claim 1, wherein the user performs an operation of flicking one tab or one window to instruct switching to the second mode on the displayed screen to switch to the second mode.

7. The information processing terminal according to claim 1, wherein the data created by using a tab or a window of the web browser includes data related to a cache and a Cookie.

8. The information processing terminal according to claim 1, wherein the data created by using a tab or a window of the web browser includes at least one of a Web Storage, an application cache, and data created by a FileSystem API.

9. The information processing terminal according to claim 1, wherein the web browser allows the first mode or the second mode to be specified in advance, and then allows a new tab or a new window to be created.

10. A method for managing data created when a website is browsed in a storage area of an information processing terminal, the method comprising:
    controlling, to store first data created when the website is browsed by using a tab of a first mode or a window of the first mode, in a first area secured in the storage area to be reused in another tab or window;
    controlling, when second data created when the website is browsed by using a tab of a second mode on the web browser or a window of the second mode has been stored in the storage area and the tab of the second mode or the window of the second mode is closed on the web browser, to delete the stored second data in the storage area;
    controlling, while the website by using a tab of the first mode on the web browser or a window of the first mode is browsed, to display a screen for switching the tab or the window from the first mode to the second mode;
    controlling, in response to switching to the second mode on the screen, to store data created when the website is browsed by using a tab or a window which has been switched to the second mode, in a second area different from the first area, as the second data; and controlling, when the tab or the window which has been switched to the second mode on the screen is closed, to delete the stored data for the tab or the window stored in the second area, wherein, when the first data has been stored in the first area and the tab of the first mode or the window of the first mode is closed on the web browser, the stored first data in the first area is not deleted, and wherein, in response to the switching to the second mode on the screen, the web browser is reactivated so that the data is stored in not the first area but the second area.

11. A computer readable storage medium on which is stored a computer program for making a computer execute a method for managing data created when a website is browsed in a storage area, the method comprising:

controlling, to store first data created when the website is browsed by using a tab of a first mode or a window of the first mode, in a first area secured in the storage area to be reused in another tab or window;

controlling, when second data created when the website is browsed by using a tab of a second mode on the web browser or a window of the second mode has been stored in the storage area and the tab of the second mode or the window of the second mode is closed on the web browser, to delete the stored second data in the storage area;

controlling, while the website by using a tab of the first mode on the web browser or a window of the first mode is browsed, to display a screen for switching the tab or the window from the first mode to the second mode;

controlling, in response to switching to the second mode on the screen, to store data created when the website is browsed by using a tab or a window which has been switched to the second mode, in a second area different from the first area, as the second data; and controlling, when the tab or the window which has been switched to the second mode on the screen is closed, to delete the stored data for the tab or the window stored in the second area, wherein, when the first data has been stored in the first area and the tab of the first mode or the window of the first mode is closed on the web browser, the stored first data in the first area is not deleted, and wherein, in response to the switching to the second mode on the screen, the web browser is reactivated so that the data is stored in not the first area but the second area.

* * * * *